United States Patent
Huang et al.

(10) Patent No.: US 6,349,561 B1
(45) Date of Patent: Feb. 26, 2002

(54) REFRIGERATION CIRCUIT FOR VEHICULAR AIR CONDITIONING SYSTEM

(75) Inventors: Yong Huang, Ann Arbor; Vipen K. Khetarpal, Novi, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/512,168

(22) Filed: Feb. 24, 2000

(51) Int. Cl.⁷ ................................................. F25B 43/02
(52) U.S. Cl. ......................................................... 62/470
(58) Field of Search ................................... 62/244, 470

(56) References Cited

U.S. PATENT DOCUMENTS

| | | |
|---|---|---|
| 3,618,708 A | 11/1971 | Deines |
| 3,945,216 A | 3/1976 | Schibbye |
| RE30,499 E | 2/1981 | Moody, Jr. et al. |
| 5,001,908 A | 3/1991 | Mayer |
| 5,205,718 A | 4/1993 | Fujisawa et al. |
| 5,207,072 A | 5/1993 | Arno et al. |
| 5,507,153 A * | 4/1996 | Seto et al. ..................... 62/244 |
| 5,603,227 A | 2/1997 | Holden et al. |
| 5,605,058 A | 2/1997 | Kurachi et al. |
| 5,694,784 A | 12/1997 | Frey et al. |
| 5,823,000 A * | 10/1998 | Takai ........................... 62/244 |
| 5,823,294 A | 10/1998 | Mizutani et al. |
| 5,927,101 A | 7/1999 | Oh |

\* cited by examiner

Primary Examiner—William Doerrler
Assistant Examiner—Mohammad M Ali
(74) Attorney, Agent, or Firm—Larry I. Shelton

(57) ABSTRACT

A vehicular air conditioning system (10) includes a compressor (110) having a crank chamber (138), a suction chamber (120), and a discharge chamber (122). A refrigerant mixture includes carbon dioxide and oil. A conduit (13) connects the discharge chamber (122) of the compressor (110) directly with an oil separator (14) to route the refrigerant mixture directly to the oil separator (14). A capillary tube (16) is connected between the oil separator (14) and the crank chamber (138) of the compressor (110) to cool and throttle oil enroute directly to the crank chamber (138) of the compressor (110).

17 Claims, 2 Drawing Sheets

REFRIGERATION CIRCUIT FOR VEHICULAR AIR CONDITIONING SYSTEM

BACKGROUND OF THE INVENTION

This invention relates in general to vehicular air-conditioning systems. In particular, this invention is concerned with a refrigeration circuit that uses carbon dioxide as a refrigerant and includes an oil separator.

Air-conditioning systems are provided in vehicles for maintaining interior air at desired temperatures. Conventional vehicular systems include a compressor, a condenser, an expansion valve (or orifice tube), and an evaporator. A refrigerant is repeatedly circulated through the cycle of compressor, condenser, expansion valve, and evaporator to maintain interior air at desired temperatures.

A typical refrigerant cycle operates in the following manner. A refrigerant is first compressed by a compressor to a high temperature and high pressure gas and then directed to a condenser. In the condenser, the gas is changed to a lower temperature, high pressure liquid as it is cooled by a heat exchanger operating with the surrounding atmosphere or cooling water. The high pressure liquid loses pressure and becomes chilled when it passes through an expansion valve. When the low pressure liquid passes through an evaporator, it evaporates as it absorbs ambient heat. The evaporated refrigerant, i.e. a gas, flows into the compressor and the process is repeated.

Oil is mixed with the refrigerant gas for lubricating and cooling the compressor. The refrigerant mixture of gas and oil is circulated inside the compressor. When the gaseous mixture is discharged from the compressor, oil remains suspended in the gas. Unless removed, the oil can travel through the condenser, expansion valve, and evaporator and adversely affect the performance of the system. Oil traveling with the refrigerant displaces refrigerant, and the efficiency of the air conditioning system decreases.

When discharged oil is not returned to the compressor, or when the return time is lengthened, a shortage of oil can occur in the compressor. Such a shortage can adversely affect operation of the compressor.

SUMMARY OF THE INVENTION

The present invention includes a vehicular refrigeration circuit using carbon dioxide and an oil separator. The oil separator is positioned directly downstream of the discharged refrigerant mixture exiting a compressor. Separated oil is routed through a capillary tube that throttles and cools the oil. The reduced pressure oil is routed directly back to the compressor to provide lubrication of the compressor and pressure regulation of a crank chamber inside the compressor. While the present invention is particularly adapted for carbon dioxide, $CO_2$, other refrigerants can be used with the system.

In a preferred embodiment, a vehicular air conditioning system includes a compressor having a crank chamber, a suction chamber, and a discharge chamber. A refrigerant mixture includes carbon dioxide and oil. A conduit connects the discharge chamber of the compressor directly with an oil separator to route the refrigerant mixture directly to the oil separator. A capillary tube is connected between the oil separator and the crank chamber of the compressor to cool and throttle oil enroute directly to the crank chamber of the compressor.

Various objects and advantages of this invention will become apparent to those skilled in the art from the following detailed description of the preferred embodiment, when read in light of the accompanying drawings.

DETAILED DESCRIPTION

Figure 1:
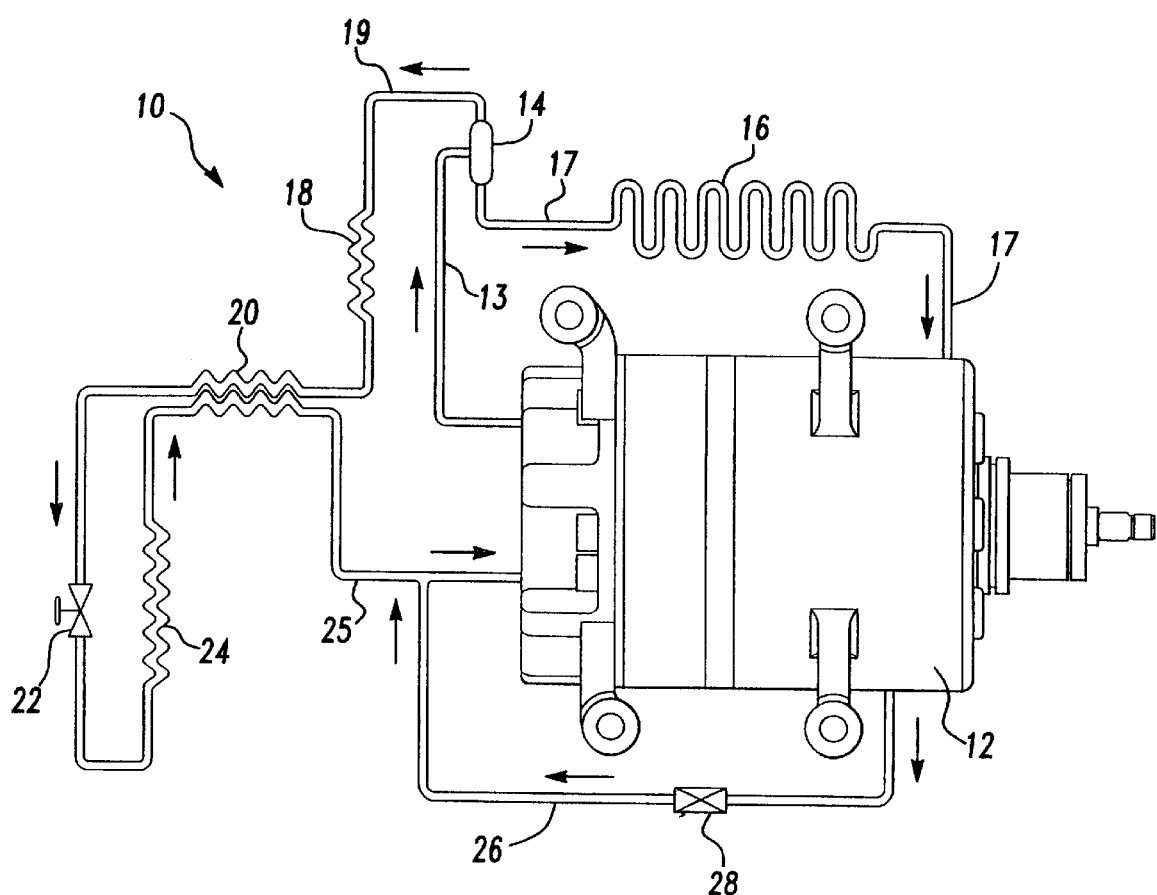
FIG. 1 is a schematic diagram of a refrigeration circuit of a vehicular air-conditioning system according to this invention.

A refrigeration circuit according to this invention is indicated generally at 10 in FIG. 1. The refrigeration circuit 10 is a closed circuit and is particular adapted for automotive or vehicular applications. A refrigerant that changes states from a gas to a liquid and back to a gas is used with the refrigeration circuit 10. A preferred refrigerant for the circuit 10 is carbon dioxide, $CO_2$.

The refrigeration circuit 10 includes a compressor 12. The compressor 12 can be of any suitable type including a variable displacement swash plate compressor. A conduit or tubing 13 is connected between the compressor 12 and an oil separator 14 to provide a direct route between the components. A refrigerant mixture (a mixture of gaseous carbon dioxide and oil) at a relatively high pressure and a relatively high temperature in a discharge chamber of the compressor 12 exits through an outlet port and is routed directly to the oil separator 14 by conduit 13. As clearly shown in FIG. 1, discharged refrigerant mixture travels directly to the oil separator 14 without passing through a gas cooler or other element of the circuit 10. The oil separator 14 separates a majority of the oil (a liquid) from the refrigerant, which is in a gaseous phase at this point of the circuit 10.

Oil from the oil separator 14 passes directly through a capillary tube 16 and back to the compressor 12. The capillary tube 16 provides two functions. First, separated oil is cooled as it travels through the capillary tube 16. Second, separated oil is throttled or reduced from a relatively high pressure of the oil/gas mixture to a relatively low pressure. The length and diameter of the capillary tube 16 are sized so that the pressure at its outlet is greater than the pressure in a suction chamber of the compressor 12.

The cooled and throttled oil is directed back to the compressor 12 to provide lubrication of internal components of the compressor 12 and to regulate pressure in a crank chamber of the compressor 12. A return line or conduit 17 containing the capillary tube 16 provides a relatively short distance for the return of oil back to the compressor 12 when compared to prior art refrigeration circuits. In other embodiments, the return line 17 can be eliminated by connecting an inlet of the capillary tube 16 to the oil separator 14 and an outlet of the capillary tube 16 to the compressor 12.

The gaseous refrigerant at the oil separator 14 is directed by conduit 19 to a gas cooler (condenser) 18 for cooling. The cooled gas refrigerant can then travel to an internal heat exchanger 20 for additional cooling to enhance system efficiency. Next, the gas refrigerant travels through a throttle valve 22 to an evaporator 24. Refrigerant from the evaporator 24 can then travel through the internal heat exchanger 20 and is introduced to an input port of the compressor 12 through conduit 25. Air surrounding the evaporator 24 is cooled and circulated in a passenger compartment as desired.

A supply line 26 having a control valve 28 directs refrigerant mixture from a crank chamber in the compressor 12 to a suction chamber in the compressor 12. The control valve 28 regulates pressure in the crank chamber relative to pressure in the suction chamber.

The present refrigeration circuit 10 provides a direct route between the compressor 12 and the oil separator 14. Oil is separated from the refrigerant early in the cycle so that the oil does not impact the thermodynamic and heat transfer performance of the refrigerant later in the cycle. Furthermore, the oil is quickly returned to the compressor 12 to provide lubrication of internal parts and regulation of the crankcase pressure. The capillary tube 16 in the return line cools and throttles the separated oil prior to its return to the compressor 12.

Figure 2:
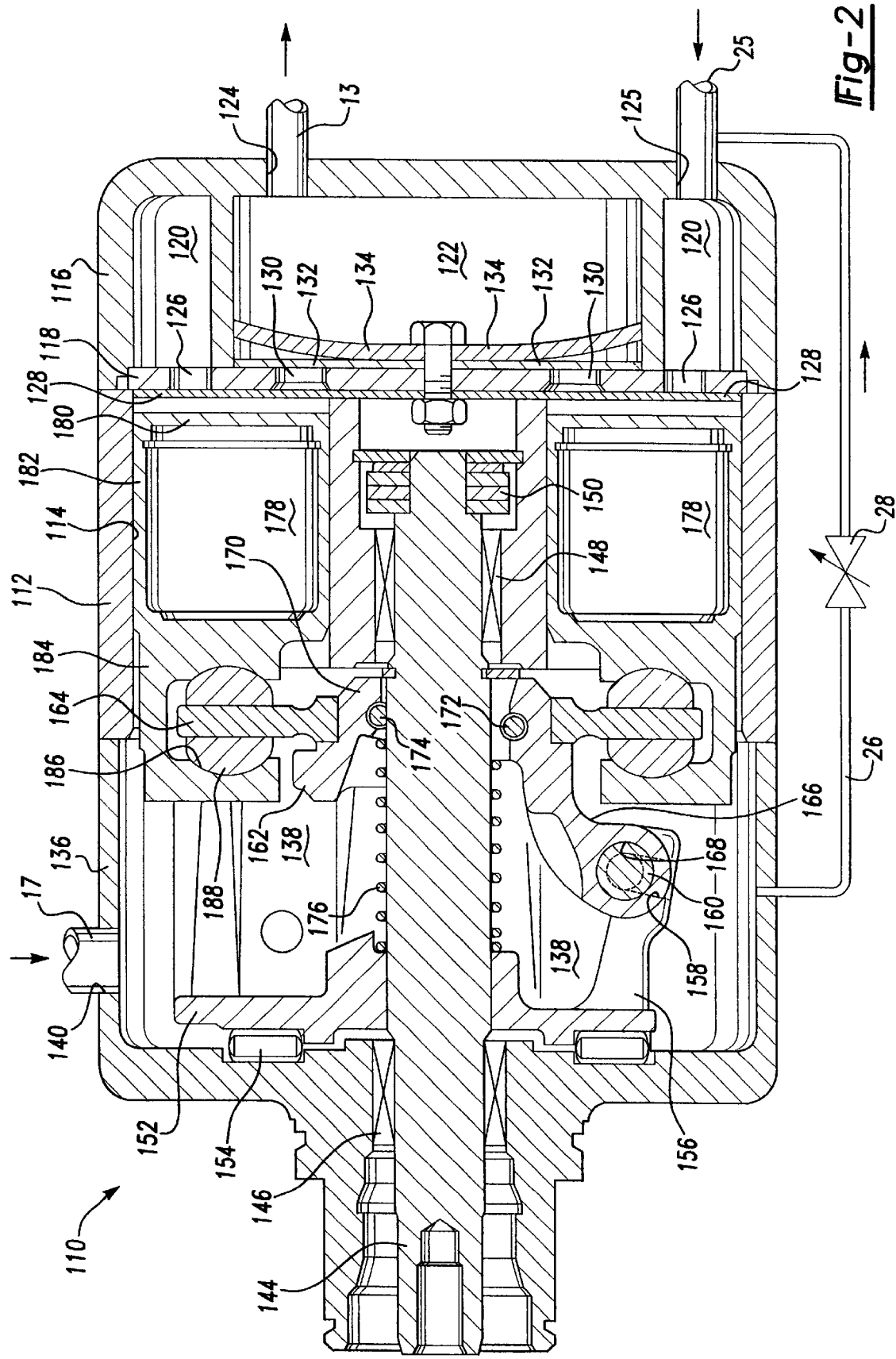
FIG. 2 is sectional view of a controllable swash plate compressor that can be used in the system of FIG. 1 including a schematically illustrated external supply line.

A variable displacement swash plate compressor is indicated generally at 110 in FIG. 2. Compressor 110 can be used in the refrigeration circuit 10 of FIG. 1. When used in circuit 10, compressor 110 replaces compressor 12.

The compressor 110 includes a cylinder block 112 having a plurality of cylinders 114. A cylinder head 116 is disposed adjacent one end of the cylinder block 112 and sealingly closes the end of the cylinder block 112. A valve plate 118 is disposed between the cylinder block 112 and the cylinder head 116.

The cylinder head 116 includes a suction chamber 120 and a discharge chamber 122. The discharge chamber 122 has an outlet port 124. Conduit 13 provides direct fluid communication between the outlet port 124 and the oil separator 14 of the circuit 10. Conduit 13 can be formed of any suitable material such as steel tubing or flexible hose.

The suction chamber 120 communicates with each of the cylinders 114 through a respective suction port 126 disposed in the valve plate 118. Conduit 25 delivers refrigerant from the evaporator 24 to the suction chamber 120 through an inlet port 125. Conduit 25 can be formed of any suitable material, such as steel tubing or flexible hose. Each of the suction ports 126 is opened and closed by a suction valve 128. Each of the cylinders 114 communicate with the discharge chamber 122 through a respective discharge port 130 disposed in the valve plate 118. Each of the discharge ports 130 is opened and closed by a discharge valve 132. A retainer 134 restricts the opening of the discharge valve 132.

A crankcase 136 is sealingly disposed at the other end of the cylinder block 112 opposite the cylinder head 116. The crankcase 136 and cylinder block 112 cooperate to form an airtight crank chamber 138. An inlet port 140 is provided to the crank chamber 138. Conduit 17 routes separated oil from the oil separator 14 to the crank chamber 138. Conduit 17 can be formed of any suitable material such as, for example, steel tubing or flexible hose.

Supply line 26, schematically illustrated in FIG. 2, is disposed between the crank chamber 138 and the suction chamber 120. The supply line 26 can be formed as an external line, as illustrated, connected to conduit 25 to communicate with the suction chamber 120. An external supply line 26 can be formed of any suitable material such as, for example, steel tubing or flexible hose. In other embodiments, the supply line 26 can be formed as an internal passage between the crank chamber 138 and the suction chamber 120.

Supply line 26 provides fluid communication between the crank chamber 38 and the suction chamber 120. Control valve 28 is disposed in the supply line 26 for controlling the flow of refrigerant gas from the crank chamber 138 to the suction chamber 120. The control valve 28 can be of any conventional type such as, for example, a ball type valve or a solenoid valve. The control valve 28 can be adapted to receive a signal from a remote source to vary the flow of the refrigerant gas therethrough. Either a mechanical or electronic type control valve can be provided. A mechanical type control valve can be arranged to receive either a temperature or pressure control signal from an evaporator in an air conditioning system to control the flow of refrigerant gas from the crank chamber 138 to the suction chamber 120 so as to regulate the pressure in crank chamber 138. An electronic type control valve can be arranged to receive an electrical signal from a microprocessor (not shown). The microprocessor for the electronic type control valve can monitor the discharge pressure of the compressor, the RPM of the vehicle engine, temperature differences, humidity, etc., to control the flow of refrigerant gas from the crank chamber 138 to the suction chamber 120.

When the control valve 28 is closed or restricted, pressure in the crank chamber 138 increases, thus reducing the stroke of the pistons in the compressor and displacement of a refrigerant mixture from the discharge chamber 122. When the control valve 28 is open, pressure in the crank chamber 138 decrease, thus increasing the stroke of the pistons and displacement of the refrigerant mixture from the discharge chamber 122.

A drive shaft 144 is centrally disposed within and arranged to extend through the crankcase 136. One end of the drive shaft 144 is rotatably supported by a bearing 146 mounted in the crankcase 136 and the opposite end is rotatably supported in a bearing 148 mounted in the cylinder block 112. Longitudinal movement of the drive shaft 144 is restricted by a thrust bearing 150 mounted in the cylinder block 112.

A rotor 152 is fixedly mounted on an outer surface of the drive shaft 144 adjacent one end of the crankcase 136 within the crank chamber 138. A thrust bearing 154 is mounted on an inner wall of the crankcase 136 in the crank chamber 138 disposed between the crankcase 136 and the rotor 152 and provides a bearing surface for the rotor 152. An arm 156 extends laterally from a surface of the rotor 152 opposite the surface of the rotor 152 that contacts the thrust bearing 154. A rectangular slot 158 is formed in the distal end of the arm 156. A pin 160 has one end slidingly disposed in the slot 158 of the arm 156 of the rotor 152.

A swash plate assembly is formed to include a hub 162 and an annular plate 164. The hub 162 includes arm 166 that extends outwardly and laterally from the surface of the hub 162. A hole 168 is formed in the distal end of the arm 166. One end of the pin 160 is slidingly disposed in the slot 158 of the arm 156 of the rotor 152, while the other end of the pin 160 is fixedly disposed in the hole 168 of the arm 166.

A hollow annular extension 170 extends from the surface of the hub 162 opposite from the arm 166. Two pins 172, 174 are disposed in the hub 162 diametrically opposed to one another with a portion of the outer surface of the pins 172, 174 exposed in the aperture of the annular extension 170 of the hub 162.

The annular plate 164 has a centrally disposed aperture adapted to receive the annular extension 170 of the hub 162, which extends therethrough. The drive shaft 144 is slidably received within the aperture formed in the hub 162 of the swash plate assembly.

A spring 176 is disposed to extend around the outer surface of the drive shaft 144. One end of the spring 176 abuts the rotor 152. The opposite end of the spring 176 abuts the hub 162 of the swash plate assembly.

A plurality of pistons 178 is slidably disposed in the cylinders 114 in the cylinder block 112. The pistons 178 each include a head 180, a dependent skirt portion 182, and a bridge portion 184. The skirt portion 182 terminates in the bridge portion 184. A pair of concave shoe pockets 186 are formed in the bridge portion 184 of each piston 178 for rotatably supporting a pair of semi-spherical shoes 188. The spherical surfaces of the shoes 188 are disposed in the shoe pockets 186 with a flat bearing surface disposed opposite the spherical surface for slidable engagement with opposite surfaces of the annular plate 64 of the swash plate assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular air conditioning system comprising:
   a compressor having a crank chamber, a suction chamber, and a discharge chamber;
   a refrigerant mixture of carbon dioxide and oil;
   an oil separator;
   a conduit connecting the discharge chamber of the compressor directly with the oil separator to route the refrigerant mixture directly to the oil separator; and
   a capillary tube connected between the oil separator and the crank chamber of the compressor to cool and throttle oil enroute directly to the crank chamber of the compressor.

2. The vehicular air conditioning system specified in claim 1 wherein pressure at an outlet of the capillary tube is greater than pressure at the suction chamber of the compressor.

3. The vehicular air conditioning system specified in claim 2 including a supply line connected between the crank chamber and the suction chamber.

4. The vehicular air conditioning system specified in claim 3 including a control valve in the supply line.

5. The vehicular air conditioning system specified in claim 3 wherein the supply line is external to the compressor.

6. The vehicular air conditioning system specified in claim 3 wherein the supply line is internal to the compressor.

7. The vehicular air conditioning system specified in claim 1 wherein the capillary tube is provided in a return line connected between the oil separator and the compressor.

8. The vehicular air conditioning system specified in claim 7 wherein the return line is in fluid communication with the crank chamber of the compressor.

9. The vehicular air conditioning system specified in claim 1 including a second conduit directing fluid from an evaporator to a suction chamber of the compressor.

10. The vehicular air conditioning system specified in claim 9 including a supply line in fluid communication with the second conduit and the crank chamber.

11. A vehicular air conditioning system comprising:
    a compressor having an inlet to a suction chamber, an outlet to a discharge chamber, and an inlet and an outlet to a crank chamber;
    a refrigerant mixture including oil;
    a first conduit connecting the outlet of the discharge chamber directly with an oil separator;
    a second conduit routing the refrigerant mixture to the inlet of the suction chamber;
    a capillary tube connected between the oil separator and the inlet of the crank chamber for throttling and cooling separated oil discharged from the oil separator.

12. The vehicular air conditioning system specified in claim 11 wherein the compressor is a variable displacement swash plate compressor.

13. The vehicular air conditioning system specified in claim 11 including a supply line connected between the outlet of the crank chamber and the suction chamber.

14. The vehicular air conditioning system specified in claim 13 including a control valve in the supply line to regulate pressure in the crank chamber.

15. The vehicular air conditioning system specified in claim 13 wherein the supply line is connected between the crank chamber and the second conduit.

16. The vehicular air conditioning system specified in claim 13 wherein pressure at an outlet of the capillary tube is greater than pressure in the second conduit.

17. The vehicular air conditioning system specified in claim 11 wherein the refrigerant in carbon dioxide.

* * * * *